United States Patent [19]

Leonard

[11] Patent Number: 5,486,932
[45] Date of Patent: Jan. 23, 1996

[54] DOCUMENT SCANNER AND VACUUM TABLE THEREFOR

[75] Inventor: Jacques V. Leonard, Antwerpen, Belgium

[73] Assignee: Agfa-Gevaert N. V., Mortsel, Belgium

[21] Appl. No.: 333,999

[22] Filed: Nov. 2, 1994

Related U.S. Application Data

[63] Continuation of Ser. No. 102,240, Aug. 5, 1993.

[30] Foreign Application Priority Data

Aug. 11, 1992 [EP] European Pat. Off. .............. 92202459

[51] Int. Cl.$^6$ ..................................................... H04N 1/04
[52] U.S. Cl. .............................. 358/498; 355/73; 355/75; 355/76
[58] Field of Search ................................... 358/449, 497; 355/73, 118, 128

[56] References Cited

U.S. PATENT DOCUMENTS 3,335,794  8/1967  Cocito .................................... 355/76
3,551,048 12/1970  Hoffman ................................. 355/76
3,597,078  8/1971  Miyauchi ............................... 355/76
4,586,815  5/1986  Hoshino et al. ....................... 355/76
4,619,526 10/1986  Hougaard .............................. 355/76
4,669,870  6/1987  Fosh ....................................... 355/76

*Primary Examiner*—Edward L. Coles, Sr.
*Assistant Examiner*—Madeleine Anh-Vinh Nguyen
*Attorney, Agent, or Firm*—William J. Daniel

[57] ABSTRACT

A vacuum table (10) for holding a document in position e.g. during scanning comprises a supporting surface (11) and a vacuum distribution line (13) which, in the absence of such a document, is in gas flow communication with the ambient atmosphere over a vacuum zone (A, B, C, D) on the table surface (11) via an array of openings (12) distributed over that surface. The table (10) further comprises means (20) such as a flexible curtain for obstructing such gas flow communication over a selected length of such array of openings (12) whereby the length (A, B) of the vacuum zone (A, B, C, D) may be matched to the length of a said document, and means (32) for selectively obstructing such gas flow communication over the width of the array whereby the width (B, C) of the vacuum zone may be matched to the width of such document.

10 Claims, 5 Drawing Sheets

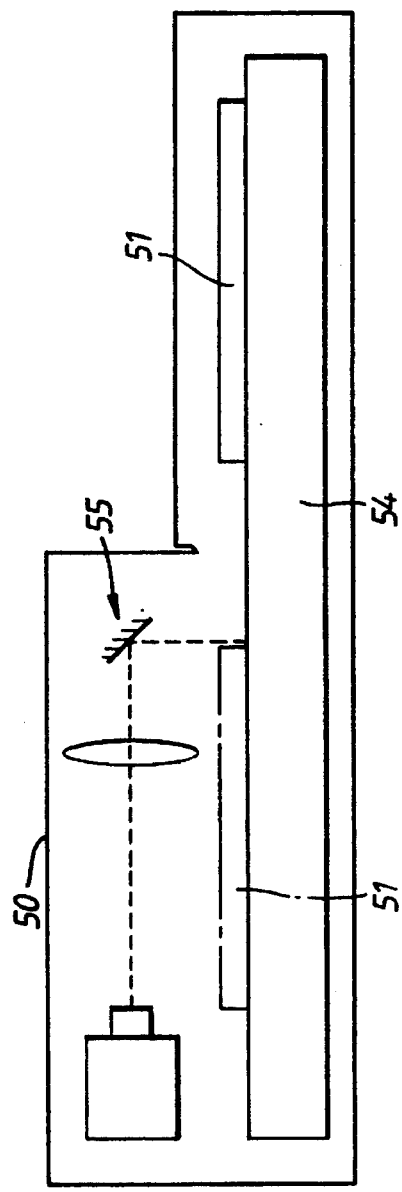
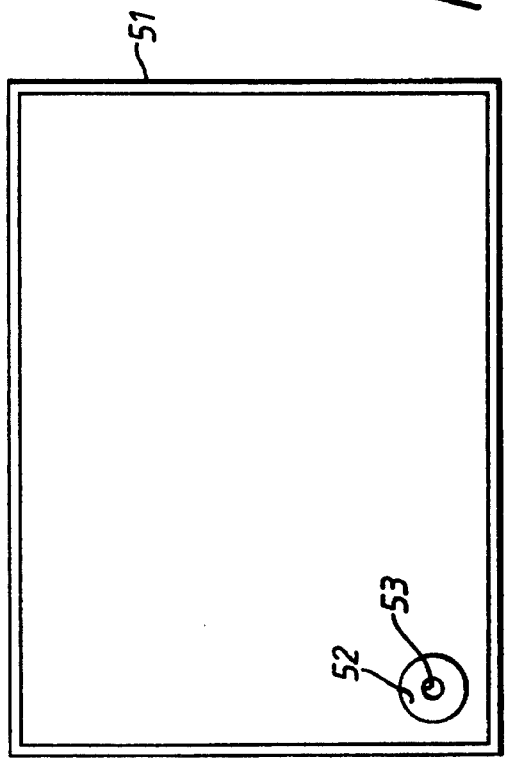

DOCUMENT SCANNER AND VACUUM TABLE THEREFOR

This application is a continuation of application Ser. No. 08/102,240, filed Aug. 5, 1993.

FIELD OF THE INVENTION

This invention relates to a vacuum table for holding a flexible sheet in position, which table comprises a supporting surface, a vacuum distribution line which, in the absence of such a sheet, is in gas flow communication with the ambient atmosphere over a vacuum zone on the table surface via an array of openings distributed over that surface. The invention also relates to a document scanner comprising a scanning table, and means for scanning a document on the table, in which such a vacuum table is used as the scanning table.

DESCRIPTION OF THE PRIOR ART

There are two principal ways of holding a document during scanning. One is the so-called "flat-bed" arrangement in which the document to be scanned is held flat on a scanning table. Such flat-bed scanners may be arranged so that the scanning table remains stationary while a document thereon is scanned raster-wise, or it may that the scanning table moves past a line-wise scanning head. In either case an electronic image file may be derived and this can be processed in various ways by a computer. Alternatively, an optical image of the scanned document may simply be focused onto a suitable light-sensitive medium for the production of photo-copies.

For such techniques to be successfully employed for the production of high-resolution defect-free images, it is necessary that the document be held flat. This can present serious practical difficulties if the document should be creased.

In one form of such apparatus, the scanning table is a sheet of glass on which the document is laid face down. The scanning mechanism is located beneath the glass and scans the document through the glass. The document can be pressed flat against the glass by means of a backing sheet which is laid over the top of the document, but this may not be effective in smoothing the document at crease lines unless the backing sheet is rather heavy, and in that case, the apparatus may be rather cumbersome to use.

Such an apparatus has certain other disadvantages. If the glass should get scratched, it will have to be replaced, which is particularly inconvenient and expensive. The glass has to be cleaned periodically. The inconvenience of this can be substantial because some types of document tend readily to transfer markings to glass. Some forms of document are liable to damage when contacting glass, e.g. in conditions of high humidity, by transferring their markings so heavily as to reduce their intensity on the document or by sticking to the glass. Some forms of document also stick locally to the glass in such a way that the scanner response varies between stuck and unstuck portions. With some forms of document having a glossy surface, there can be a thin layer of air trapped between some parts of the document and the glass and interference fringes can be produced.

To overcome these problems, an alterative scanning table technique has been developed, in which the document is laid on the table face up and scanned from above. To hold the document flat, a vacuum table is used, in which the table is provided with suction means so that the document is held flat on the table by the consequential air pressure difference.

The term "vacuum" is conventionally used although the pressure reduction is often of the order of only 2 kPa (20 cm $H_2O$, or 0.02 atmosphere). It will be appreciated that greater pressure reductions, for example 20 to 30 kPa, may be used if desired, and that thick and/or stiff documents can tolerate, and may even require, such increased pressure differentials.

A serious problem arises in the use of a vacuum table if the document is smaller than the active vacuum zone on that table. In that situation, the suction results in excessive air flow in those parts of the table that are not covered by the document. This causes excessive noise, and reduces the suction on the document itself, so increasing the danger of the document not being held flat, and in particular, it promotes the influx of air currents which may well be laden with dust. Any dust present during scanning could have a markedly adverse effect on the quality of the image produced.

DESCRIPTION OF THE INVENTION

OBJECT OF THE INVENTION

It is an object of this invention to provide a vacuum table in respect of which those disadvantages can be alleviated.

SUMMARY OF THE INVENTION

According to the invention, there is provided a vacuum table for holding a flexible sheet in position, which table comprises a supporting surface, a vacuum distribution line which, in the absence of such a sheet, is in gas flow communication with the ambient atmosphere over a vacuum zone on the table surface via an array of openings distributed over that surface, characterised in that such table further comprises means for obstructing such gas flow communication over a selected length of such array whereby the length of the vacuum zone may be matched to the length of a said flexible sheet, and means for selectively obstructing such gas flow communication over the width of the array whereby the width of the vacuum zone may be matched to the width of such flexible sheet.

By adopting the present invention, the size of the vacuum zone which is activated at any given time may be matched more easily to the size of a document to be scanned, so that the number of openings of the array which are exposed to vacuum and not covered by the document is minimised. This has a number of consequential advantages. Air flow into the apparatus is reduced, and the influx of dust is thereby reduced. Because air flow is reduced, a lower power vacuum source may be used, thus presenting a saving in materials, capital cost and running (power) costs. Also, a less massive vacuum source may be more easily mounted to the scanning machine in such a manner that it does not transmit vibrations which could adversely affect the quality of the scanned image.

The present invention extends to a scanner incorporating such a table, and accordingly the invention also provides a document scanner comprising a scanning table, and means for scanning a document on the table, characterised in that such scanning table is a vacuum table according to this invention, the scanner being arranged to scan a document lying face up on such table.

BRIEF DESCRIPTION OF THE DRAWINGS

Two preferred embodiments of vacuum table embodying the invention will now be described, by way of example, with reference to the drawings, in which:

FIG. 5 is a diagrammatic view of a scanner incorporating such a table;

FIG. 6 is a plan view of a vacuum table bed of the scanner of FIG. 5;

DETAILED DESCRIPTION OF PREFERRED EMBODIMENTS OF THE INVENTION

Figure 1:
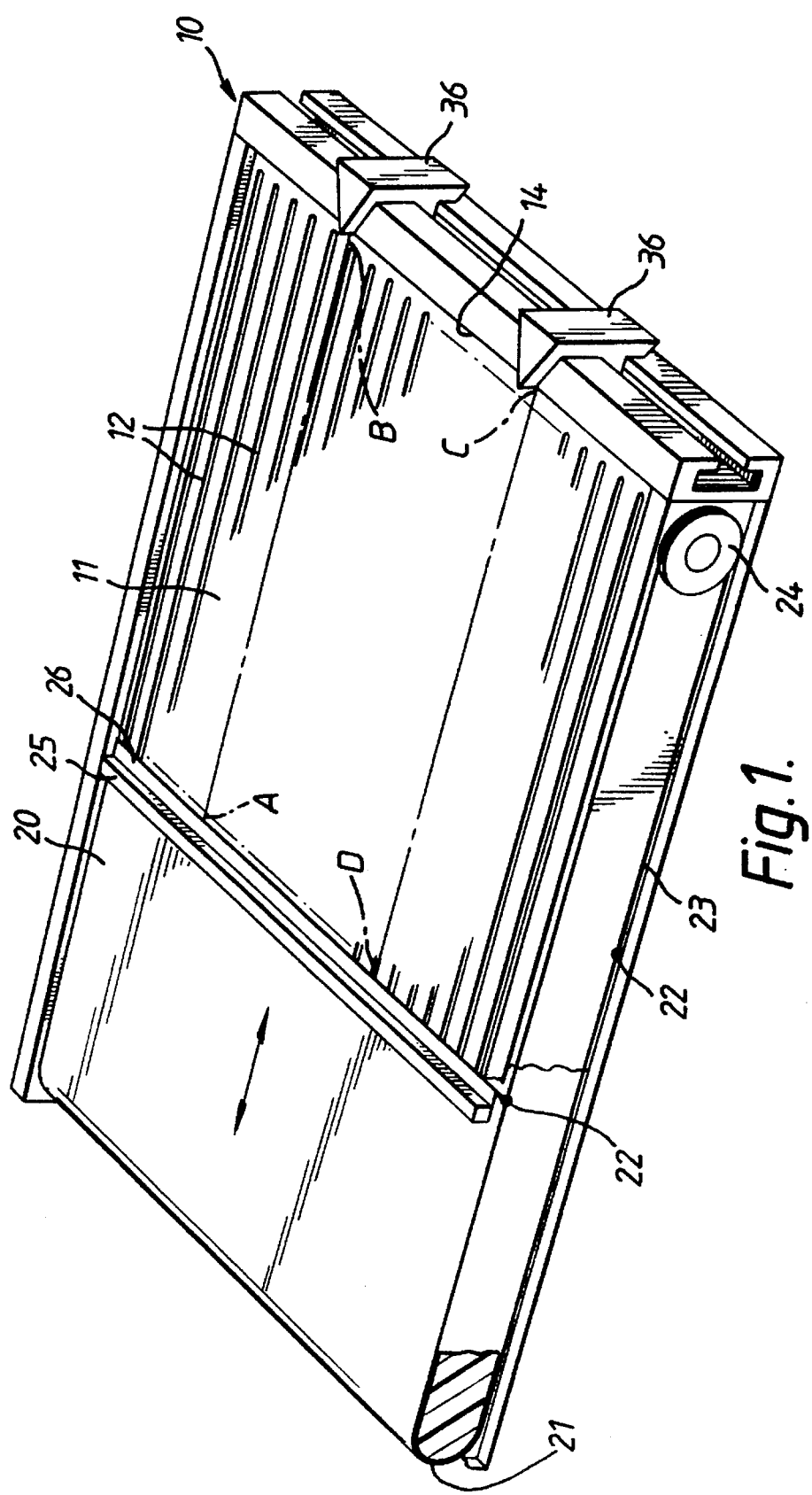
FIG. 1 is a general perspective view of the table.
Figure 2:
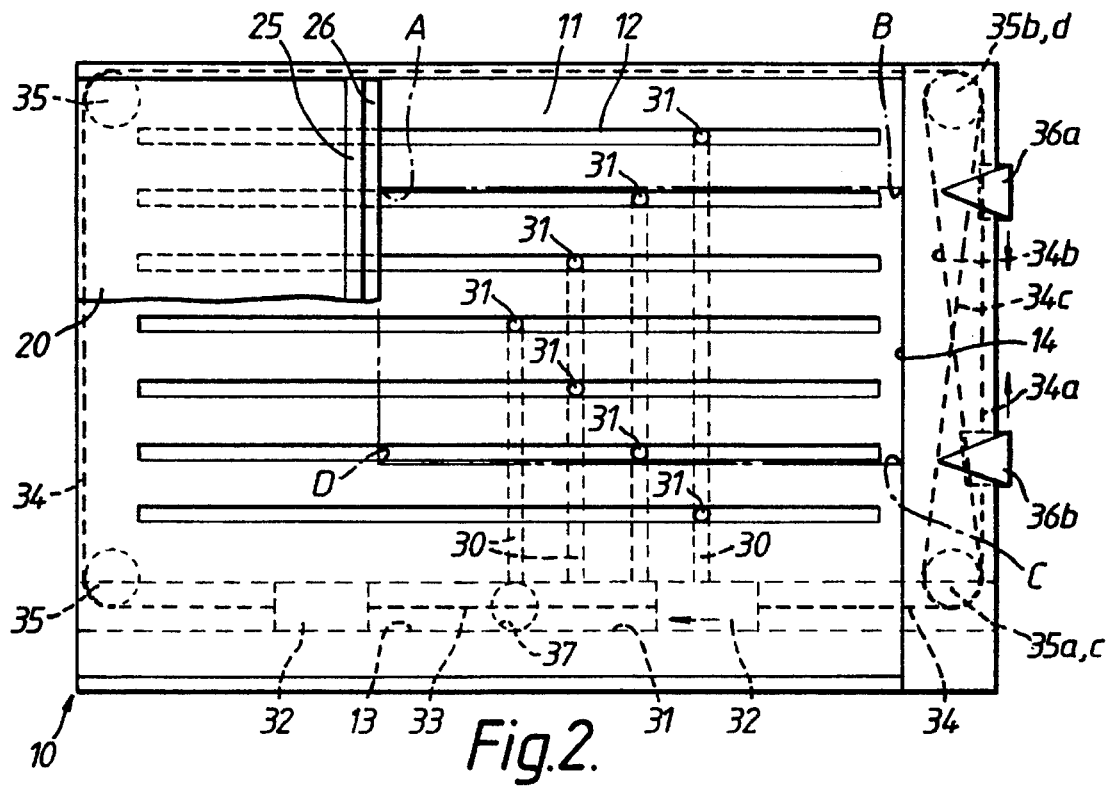
FIG. 2 is a diagrammatic top view of the table showing the grooves and their vacuum feed means.

Referring to FIGS. 1 and 2, the table comprises a main body 10 having a supporting surface 11, having an array of openings 12, shown as grooves, distributed over that surface to constitute longitudinal airways. In alternative embodiments, such longitudinal airways might be constituted by rows of individual apertures, but this would serve to make the construction of the table more complicated.

A vacuum distribution line 13 (see FIG. 2) is connected to the longitudinal grooves 12 in the upper surface 11 of the vacuum table by means of transverse airways 30 in gas flow communication with the ambient atmosphere over a vacuum zone A, B, C, D on the table surface.

The table has an adjustable cover 20 in the form of a curtain which is substantially impermeable by air and the length of which is sufficient to cover the lengths of the longitudinal grooves 12. This curtain 20 passes over a rounded bearing surface 21 at the left-hand end of the table. The curtain 20 is flexible and is mounted as a closed loop extending between bearings at opposite ends of the table. Thus, corners 22 of the curtain 20 are joined in pairs by a pair of cords 23, each cord passing over a corresponding one of a pair of bearing wheels 24 mounted at the corners of the right-hand end of the table; for convenience only one such cord 23 and bearing 24 are shown. This maintains the curtain 20 in taut condition to promote sealing and ease of movement as it is slid across the surface of the vacuum table to increase or decrease the length A, B of the vacuum zone A, B, C, D. The curtain 20 has a bar 25 attached towards its right-hand end as shown to assist such sliding movement. The leading edge of such curtain projects beyond said bar to form a thin lip 26.

If the document on the table is not long enough to extend the full length of the table, it is placed at the right-hand end of the table supporting surface 11 against a shoulder 14, and the curtain 20 is drawn across the table (by means of the bar 25) from the left-hand end until it reaches the left-hand edge of the document. This seals off those parts of the grooves 12 which extend beyond the left-hand end of the document. We have found that locating the thin lip 26 beneath the edge of a document further promotes sealing so reducing the inflow of air during activation of the vacuum table, and also allowing the whole of the document to be scanned. Such lip is suitably 3 to 6 mm wide, and it may be for example 0.2 mm thick.

If desired, a pair of oppositely movable curtains could be used, allowing the document be placed centrally longitudinally of the table, the two curtains being pulled across the table from each of its ends.

Figure 3:
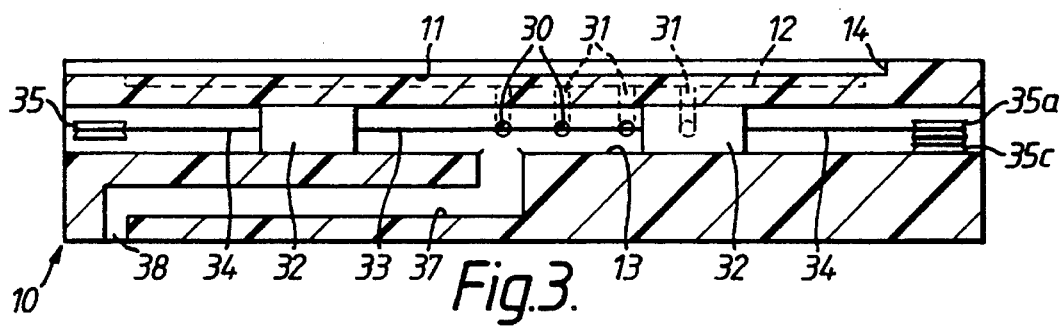
FIG. 3 is a diagrammatic side view of the table.
Figure 4:
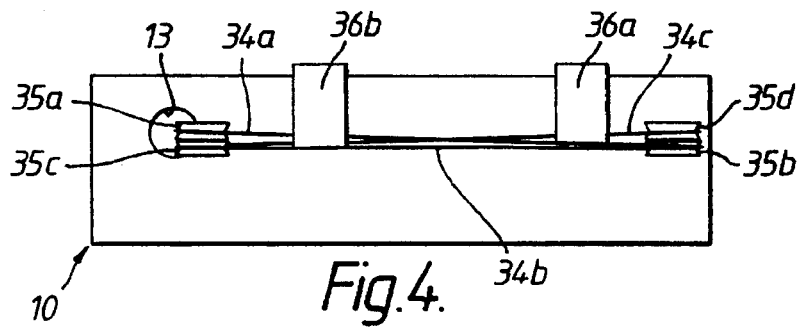
FIG. 4 is a diagrammatic view of the right-hand end of the table.

FIGS. 2 to 4 show a preferred manner in which the grooves 12 may be connected to vacuum. The main body 10 of the table has a set of transverse airways 30 through it, below and at right angles to the grooves 12. In the embodiment illustrated, the longitudinal airways constituted by the grooves 12 are substantially equally spaced apart, by a distance substantially equal to the spacing between the transverse airways 30. We have found that a spacing of about 10 mm gives satisfactory results for most purposes. The longitudinal airways 12 are arranged symmetrically of a median line 15 of the table, and each of a plurality of the transverse airways 30 is connected to two such longitudinal airways which are spaced equally from such line of symmetry 15 by means of vertical bores 31 whereby such connection points are arranged in chevron fashion, with the outermost two grooves connected to the endmost transverse airway, the next two grooves in to the next transverse airway, and so on. (The chevron pattern need not be complete. It may be broken at its apex with two or more grooves being connected to the last transverse airway.)

The transverse airways 30 all lead into vacuum distribution line 13 which is in the form of a cylindrical passageway each of whose ends is closed by a piston 32. The pistons 32 are linked together by a cable 33 leading within the vacuum distribution line 13, and by a cable 34 which runs round a series of bearing pulleys 35 and connects the pistons together outside the vacuum distribution line. In this way, the vacuum distribution line 13 is constituted by a cylinder of fixed length which is movable along the length of the vacuum table 10.

The vacuum distribution line 13 is connected to a line 37 terminating in an orifice 38 in the base of the table via which it may be connected to a vacuum source.

As represented in FIGS. 2 to 4, the cable 34 follows a cross-over path at the right hand end of the table 10. Thus at that right hand end of the table, the reach of the cable 34 leaving the passageway which is a continuation of the vacuum distribution line 13 passes first round an upper one 35a of a pair of bearing pulleys located at one corner of that end of the table, (FIGS. 3 and 4) and is then led back (FIGS. 2 and 4) as a normal cable reach 34a to a lower one 35b of a pair of beating pulleys located at the other corner of that end of the table. The cable then returns as oblique reach 34b to a lower beating pulley 35c at the first corner of the table and goes obliquely back as reach 34c to upper beating pulley 34d at the second corner. From that fourth bearing pulley 35d, the cable 34 runs back around the periphery of the table and is connected to the piston 32 at the opposite end of the vacuum distribution line 13.

The linked pistons 32 are movable along the length of the table by sliding handles 36 which are connected to different reaches of the cable 34. Such connection is shown in FIGS. 2 and 4. The handles 36 are suitably constituted as pointers. A first one 36a of the pointer handles 36 is made fast to normal cable reach 34a, and the other pointer handle 36b is made fast to oblique cable reach 34b. In the result, as the pointer handles are moved closer together as indicated by arrows in FIG. 2, the two ganged pistons 32 move to the left of that Figure, and as those pistons move, they successively isolate the transverse airways 30 from the vacuum source, so progressively narrowing the active vacuum zone A, B, C, D. The pointer handles 36 are arranged to give an indication of the width of the vacuum zone A, B, C, D at any given moment.

In the position shown in FIGS. 2 to 4, the pistons 32 are so positioned that all but one of the transverse airways 30 are able to communicate with the vacuum distribution line 13 between those pistons, and the pointers 36 of FIG. 2 indicate that the width B, C of the vacuum zone embraces all the longitudinal grooves except for the two outermost ones. As the handles 36 are brought closer together, thus indicating a narrower vacuum zone, the pistons 32 will move further to the left of FIGS. 2 and 3, thus closing off successive transverse airways 30 and closing communication between the vacuum distribution line 13 and firstly the two next outermost longitudinal airways 12, and then the two next successive longitudinal airways, and so on, thus giving a successively narrower vacuum zone A, B, C, D. The vacuum line 37 enters the vacuum distribution line 13 at a point level with the entry point of the transverse airway 30 which is connected to the central longitudinal airway 12 in order to maintain vacuum during such movement of the pistons 32. The use of a pair of pistons 32 which are linked together in this way permits variation of the vacuum distribution line 13 in a very simple manner, without giving rise to an special problems of sealing the ends of that vacuum line. The pistons may be provided with ring seals (not shown) if desired.

This correspondence between the distance apart of the pointers 36 and the width B, C of the vacuum zone is particularly convenient for an operator of the scanner in providing a simple and effective indication of the active vacuum zone at any time. Such correspondence is made possible because the spacings between the longitudinal airways and the transverse airways are the same so that the limbs of the chevron on which lie the connection points at the ends of the vertical bores 31 are at 45° to the length and breadth of the table.

The system thus applies vacuum to a set of grooves forming a longitudinal zone across the table top 11, the width B, C, of the zone being dependent on the positions of the pistons 32; the zone is always centered on the line of symmetry 15 of the longitudinal airways 12 on the table top. A document should thus be placed centrally along that line of symmetry; by adjusting the positions of the pistons 32 appropriately, the width B, C of the zone of vacuum can be adjusted to match the width of the document.

The whole of the document can thus be held flat on the table top by suction, while by adjusting the positions of the curtain 20 and the pistons 32, there will be substantially no leakage over the parts of the table top not covered by the document.

FIG. 5 shows a scanner 50 incorporating a table as described with reference to FIGS. 1 to 4. In FIG. 5, the vacuum table rests in a movable bed 51 which is also shown, in plan view in FIG. 6. In FIG. 6 it will be seen that the bed for the vacuum table incorporates in one corner a suction cup 52 having a central aperture 53. The suction cup 52 is positioned so that it is in register with the orifice 38 (FIG. 3) which opens via line 37 into the vacuum distribution line 13 of the vacuum table 10. The table simply rests on the suction cup 52, and an effective seal is formed in a very simple manner. The central aperture 53 of the suction cup 52 is connected by a flexible pipe to a vacuum pump (not shown) which may be mounted on springs so as to minimise the transmission of vibrations to the frame of the scanner 50.

Reverting now to FIG. 5, the vacuum table bed 51 is mounted on a transporter 54 for moving the vacuum table bed 51 past an optical scanning system diagrammatically represented at 55 which scans a document on the vacuum table from above as that bed moves towards the position shown in dotted lines. The vacuum table is placed in the scanner so that its longitudinal airways (12 in FIGS. 1 and 2) are parallel with the direction of movement during scanning. In this way, a document of no matter what width always occupies the central portion of the scanning path where the optical scanning system 55 may be expected to have its optimum performance.

Figure 7:
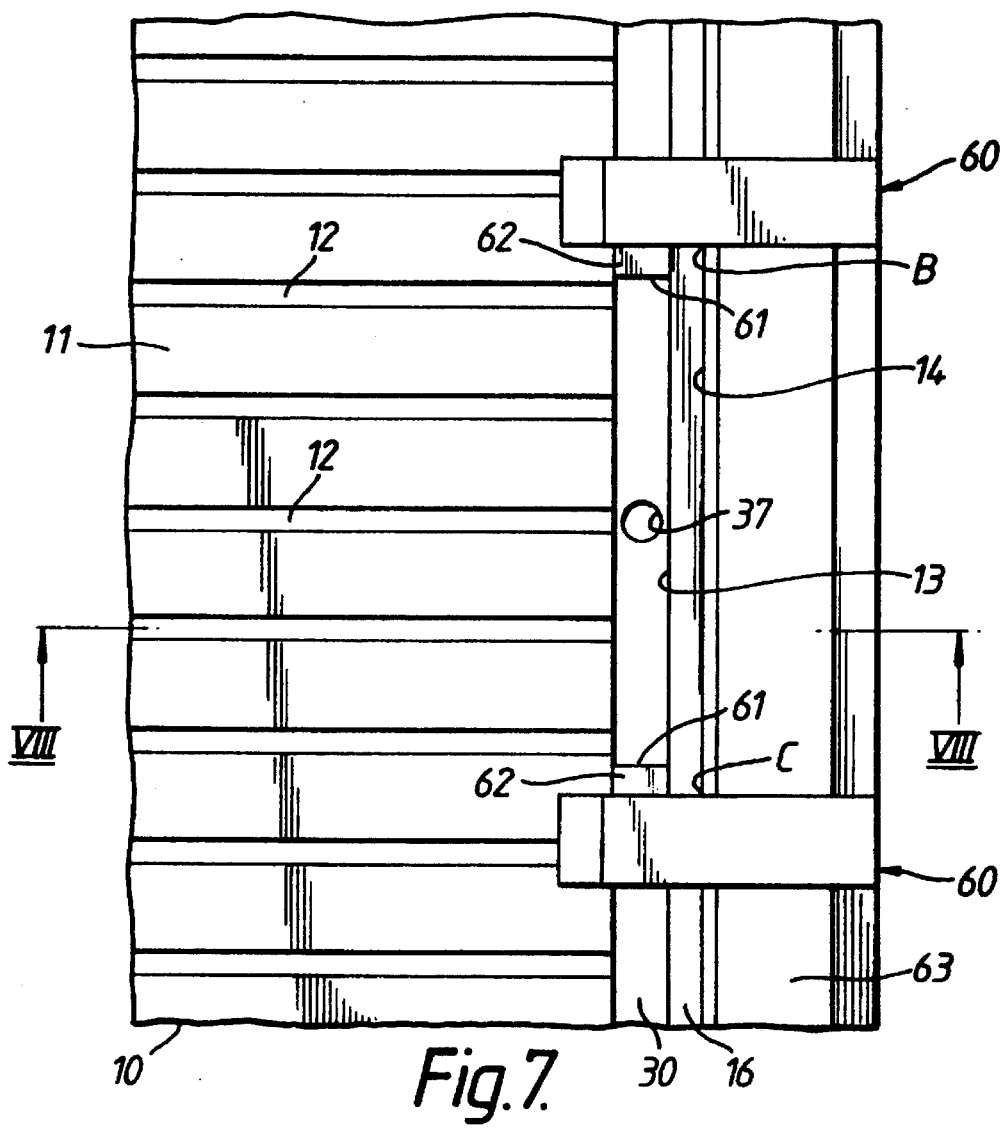
FIG. 7 is a detail plan view of one end of a first alternative embodiment of vacuum table.
Figure 8:
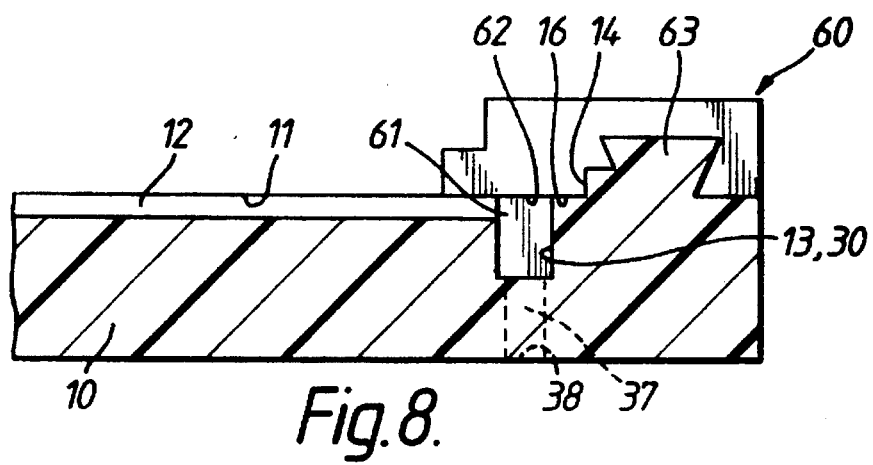
FIG. 8 is a section on the line VIII—VIII of FIG. 7.

In FIGS. 7 and 8 are shown details of an alternative way of connecting grooves 12 in the supporting surface 11 of a vacuum table 10 to a source of vacuum. The longitudinal grooves 12 communicate with a common transverse airway 30 formed as a groove close to the right hand end of the supporting surface defined by the shoulder 14. The transverse airway groove 30 is slightly spaced from that shoulder 14 to leave a supporting strip 16 at that end of the supporting surface 11. A pair of slide members 60 is provided, each having an obturating portion 61 which sits in and locally fills the transverse airway groove 30 so that a vacuum distribution line 13 is defined between those slide members. The vacuum distribution line 13 is, as before, connected via a line 37 to an orifice 38 in the base of the table 10 for the application of vacuum. The line 37 suitably enters the groove 30 at its mid point so that the slide members 60 may be positioned to give a central vacuum distribution line 13. Each slide member 60 is shaped to provide a shoulder 62 which will provide support for the edge of a document at the ends of the vacuum distribution line 13. As shown, the slide members are mounted on a dovetail formation 63 on the table body, though it will be appreciated that other arrangements are possible.

Figure 9:
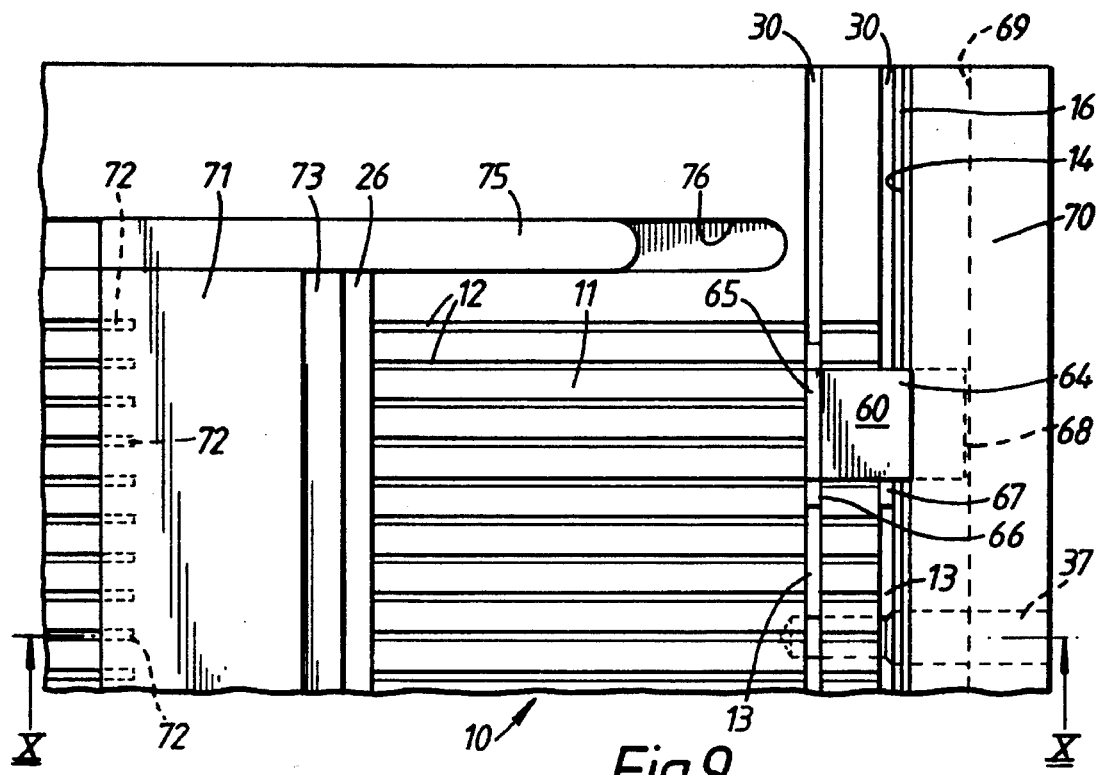
FIG. 9 is a detail plan view of one end of a second alterative embodiment of vacuum table.
Figure 10:
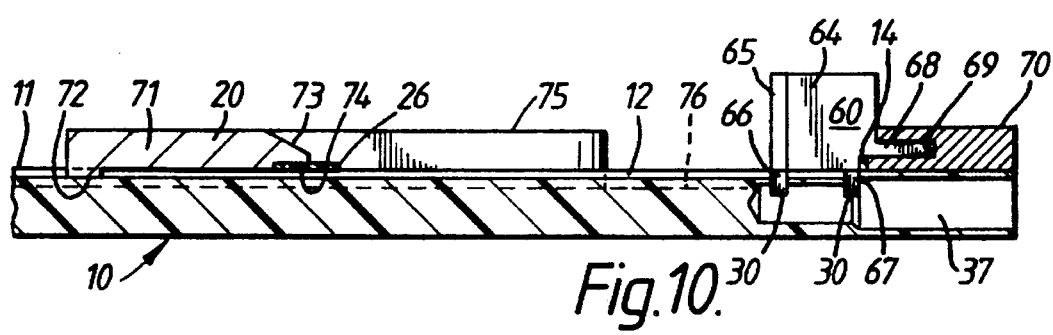
FIG. 10 is a section on the line X—X of FIG. 9.

Such an alternative arrangement is shown in FIGS. 9 and 10. Again, like reference numerals are used to designate like elements of the construction.

Figure 11:
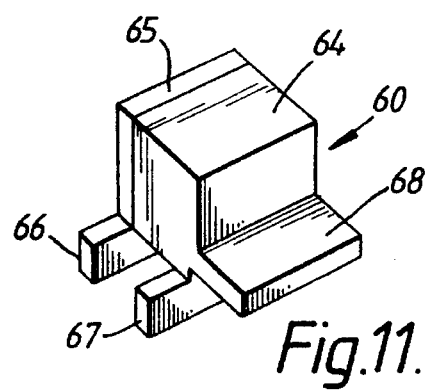
FIG. 11 is a perspective view of a slide member also shown in FIGS. 9 and 10.

In FIGS. 9 and 10, there are shown two transverse grooves 30 for connection to a vacuum source via a central line 37 which in this embodiment opens out at the end of the vacuum table 10. Again, a pair of slide members 60 (only one is shown) are provided for obturating the transverse airway grooves 30, one to each side on the line 37. As also shown in FIG. 11, the slide member is of two part construction comprising a block 64 and a plate 65 attached to it. A lower portion of the plate 65 is constituted as a foot 66 obturating one groove 30, and a second obturating foot 67 is provided on the base of the block 64. The block 64 is also provided with a flange 68 which is arranged to slide in a groove 69 in a strip 70 which is secured along the head end of the table 10. This flange 68 ensures that the slide member 60 is properly held in position so that the obturating feet 66, 67 fill the grooves 30 to minimise leakage at the ends of the vacuum distribution lines 13 constituted by those parts of the grooves 30 which lie between the slide members 60 which latter thus define the width of the active vacuum zone at any given time.

Also shown in FIGS. 9 and 10 is a modification of the means for controlling the length of the active vacuum zone. Such means comprises a plate member 71 formed along its trailing edge with a plurality of protrusions 72 each of which is adapted locally to block one of the longitudinal grooves 12 in the surface 11 of the vacuum table. The leading edge of such plate member 71 is shown bevelled at 73, and it is undercut at 74 so that a thin strip of material such as polyethylene terephthalate may be cemented in to provide a lip 26 analogous to that described with reference to FIGS. 1 and 2. Movement of the plate member 71 along the table 10 parallel with itself is assisted by an arm 75 bolted to one end of that plate and sliding in a longitudinal groove 76 in the surface of the table.

I claim:

1. In a vacuum table for holding a generally rectangular flexible sheet of variable dimensions in position, which table comprises a supporting surface having a length and width for supporting said flexible sheet thereon with one axis of such sheet parallel with the length of said surface, a vacuum source, and connected to said source a vacuum distribution line which, in the absence of such a sheet on said surface, is in gas flow communication with the ambient atmosphere over a generally rectangular vacuum zone on the table surface via openings distributed over that surface to define said vacuum zone, in combination, the improvement wherein said openings are arranged in rows extending generally lengthwise of said surface along generally parallel lines spaced apart widthwise of said supporting surface, said rows of opening having substantially the same length, and said table further comprises means for obstructing said rows of openings for gas flow communication therethrough over an adjustable generally common end portion of the length thereof whereby the length of the vacuum zone may be matched to the dimension of said flexible sheet parallel to the length of said surface, and control means independent of the obstructing means for disconnecting from said vacuum distribution line selected ones of said lengthwise extending rows of openings whereby the dimension of the vacuum zone parallel to the surface width may be matched to the corresponding dimension of such flexible sheet.

2. A vacuum table according to claim 1, wherein said means for obstructing rows of said openings against gas flow communication over said adjustable common end portion thereof comprises a substantially air-impermeable curtain slidable lengthwise over said supporting surface to cover and thereby obstruct said common end portion of said rows of openings.

3. A vacuum table according to claim 2, wherein said curtain is flexible and together with operating cables connected between its opposite ends is mounted as a closed loop extending around said supporting surface.

4. A vacuum table according to claim 2, wherein said curtain has a bar attached adjacent a leading edge thereof for manual engagement to facilitate sliding of the curtain over said surface.

5. A vacuum table according to claim 1, wherein said control means for selectively disconnecting said vacuum distribution line to said rows of said openings includes valve means in said distribution line for sequentially disconnecting said rows of openings from said distribution line and indicating means mounted adjacent a side of said supporting surface for manual movement along said side to indicate by the position of said indicating means the width of the effective vacuum zone at any given time and means connecting said indicating means to said valve means whereby manual movement of said indicating means activates said valve means to disconnect the selected rows of said openings.

6. The vacuum table according to claim 5 wherein said indicating means comprises a pair of indicator mounted adjacent a side of said surface parallel to the surface width for movement toward and away from one another and the separation between said indicators at a given time corresponds to the dimension of the effective vacuum zone parallel to the surface width.

7. A vacuum table according to claim 1, wherein said rows of openings are formed as grooves in said supporting surface.

8. A vacuum table according to claim 1, wherein said rows of openings are substantially equally spaced apart widthwise across said supporting surface.

9. The table of claim 1 wherein said adjustable common end portion of said lengthwise extending rows of openings is infinitely adjustable along substantially the entire length of said rows of openings.

10. The table of claim 1 wherein said lengthwise extending rows of openings are spaced widthwise of said surface on either side of the widthwise center of said surface and are symmetrically arranged on either side of said widthwise center.

* * * * *